Aug. 10, 1943.　　K. KURZBIN　　2,326,146
CANNING APPARATUS
Filed May 2, 1939　　6 Sheets-Sheet 1
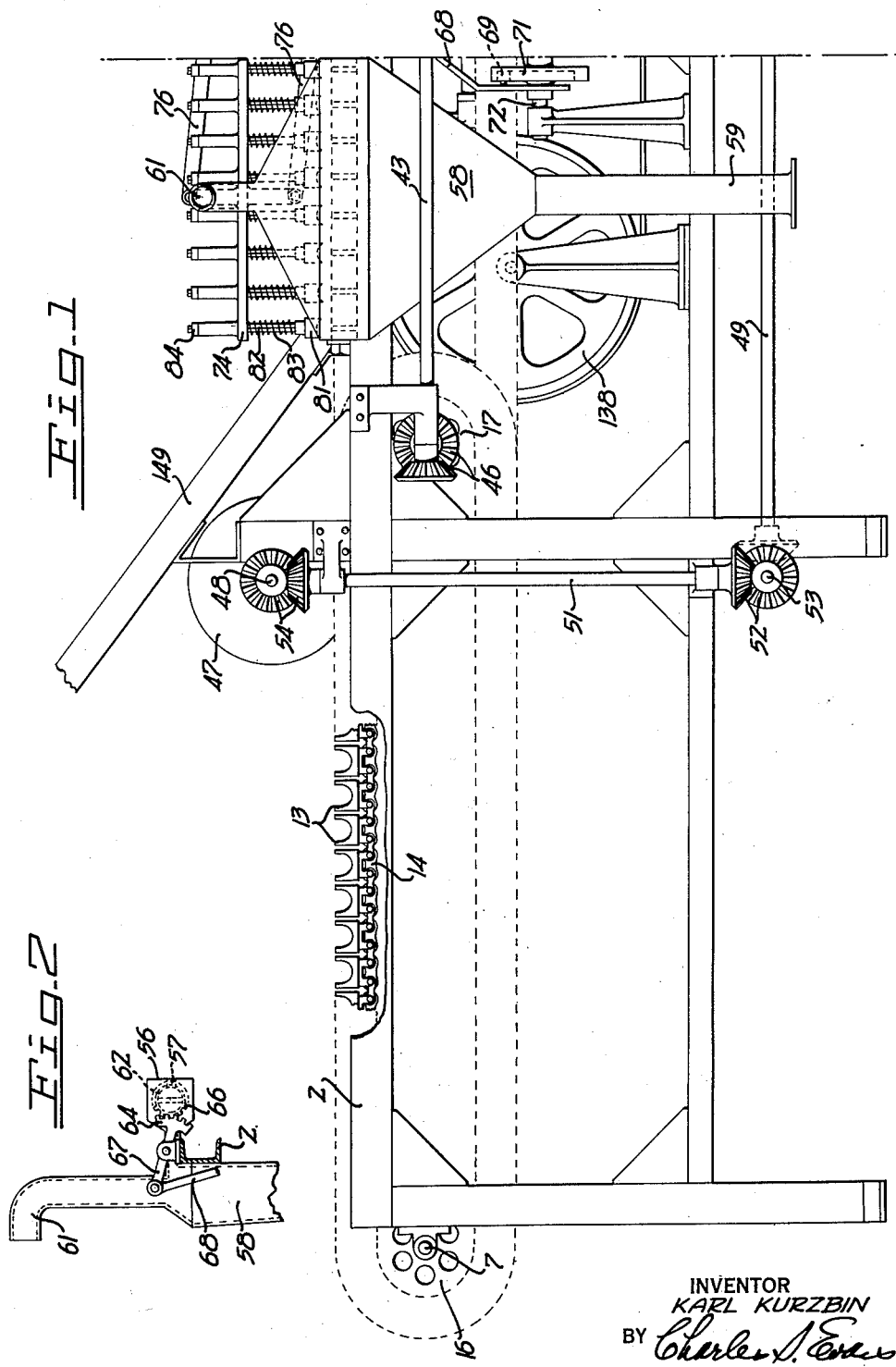
INVENTOR
KARL KURZBIN
BY Charles J. Evans
HIS ATTORNEY

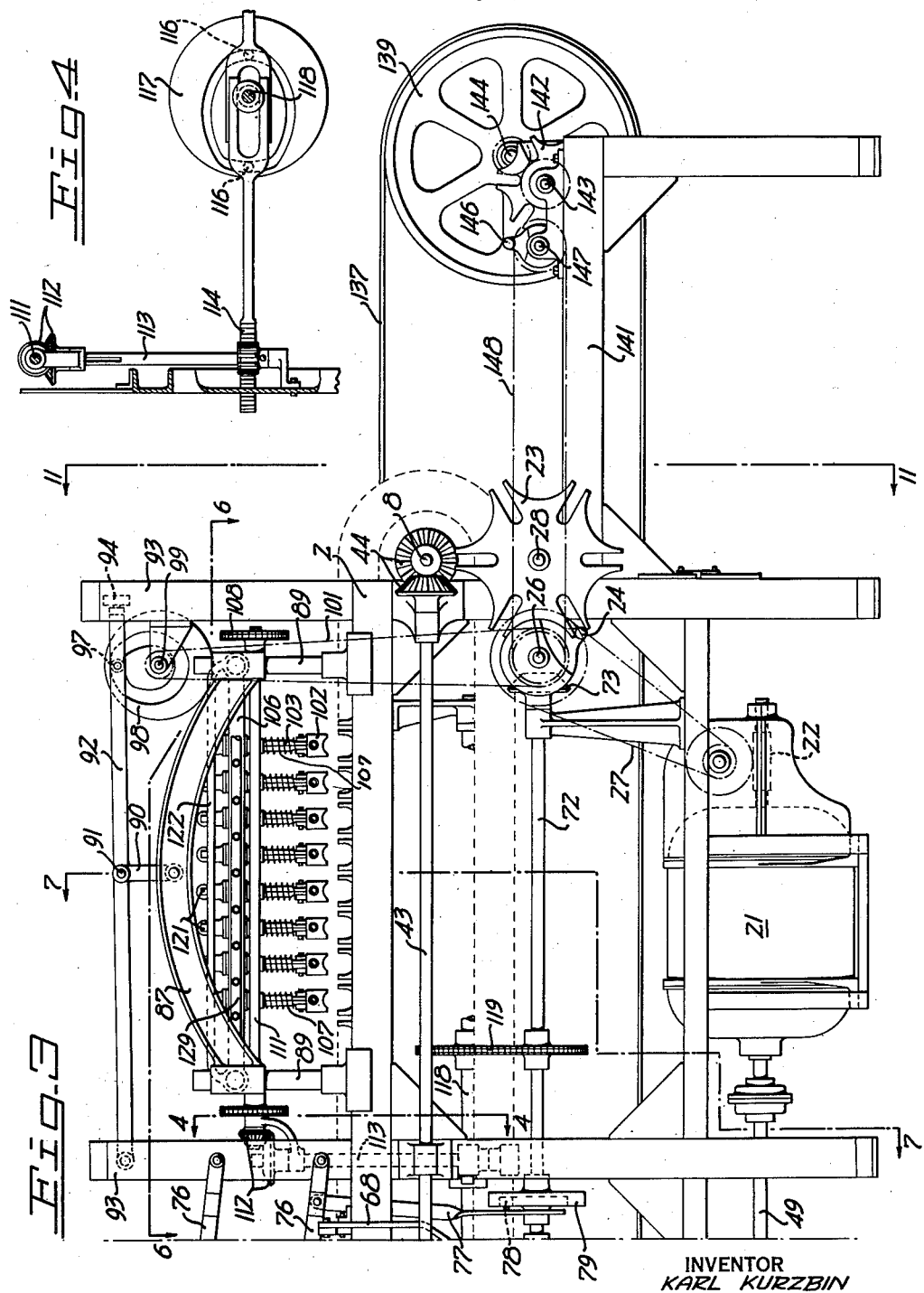

Aug. 10, 1943.    K. KURZBIN    2,326,146
CANNING APPARATUS
Filed May 2, 1939    6 Sheets-Sheet 3
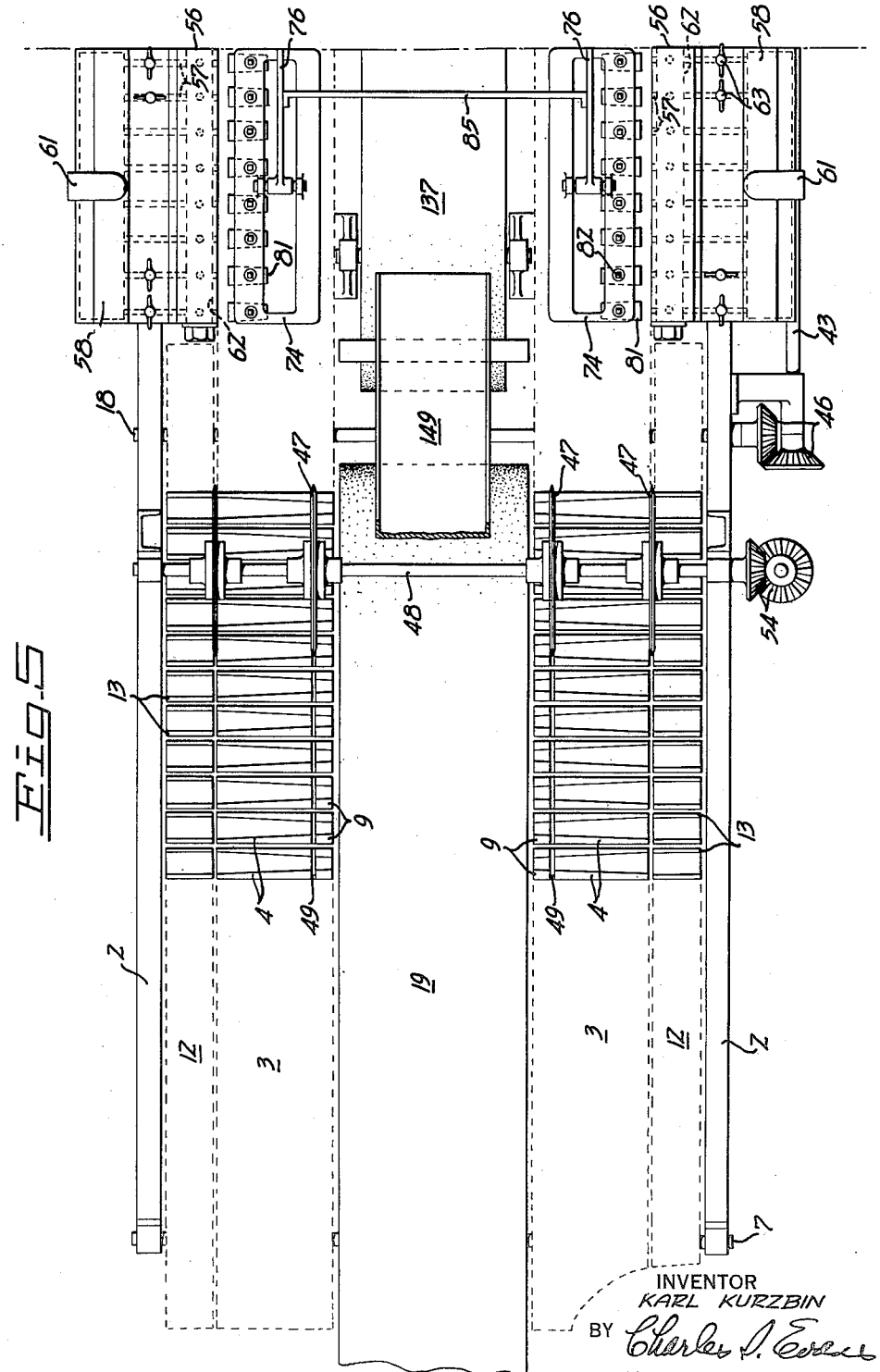
INVENTOR
KARL KURZBIN
BY Charles J. Essex
HIS ATTORNEY

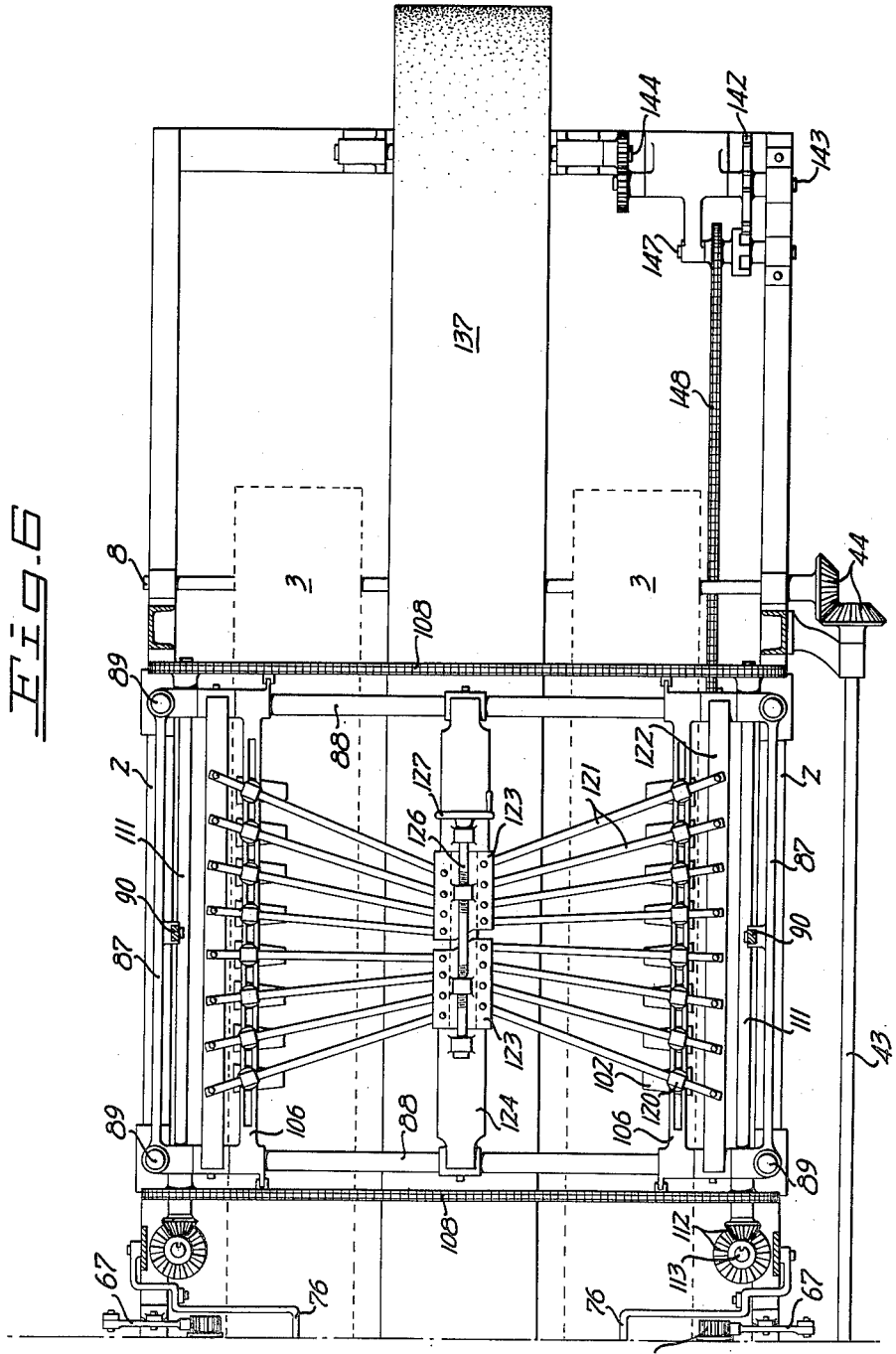

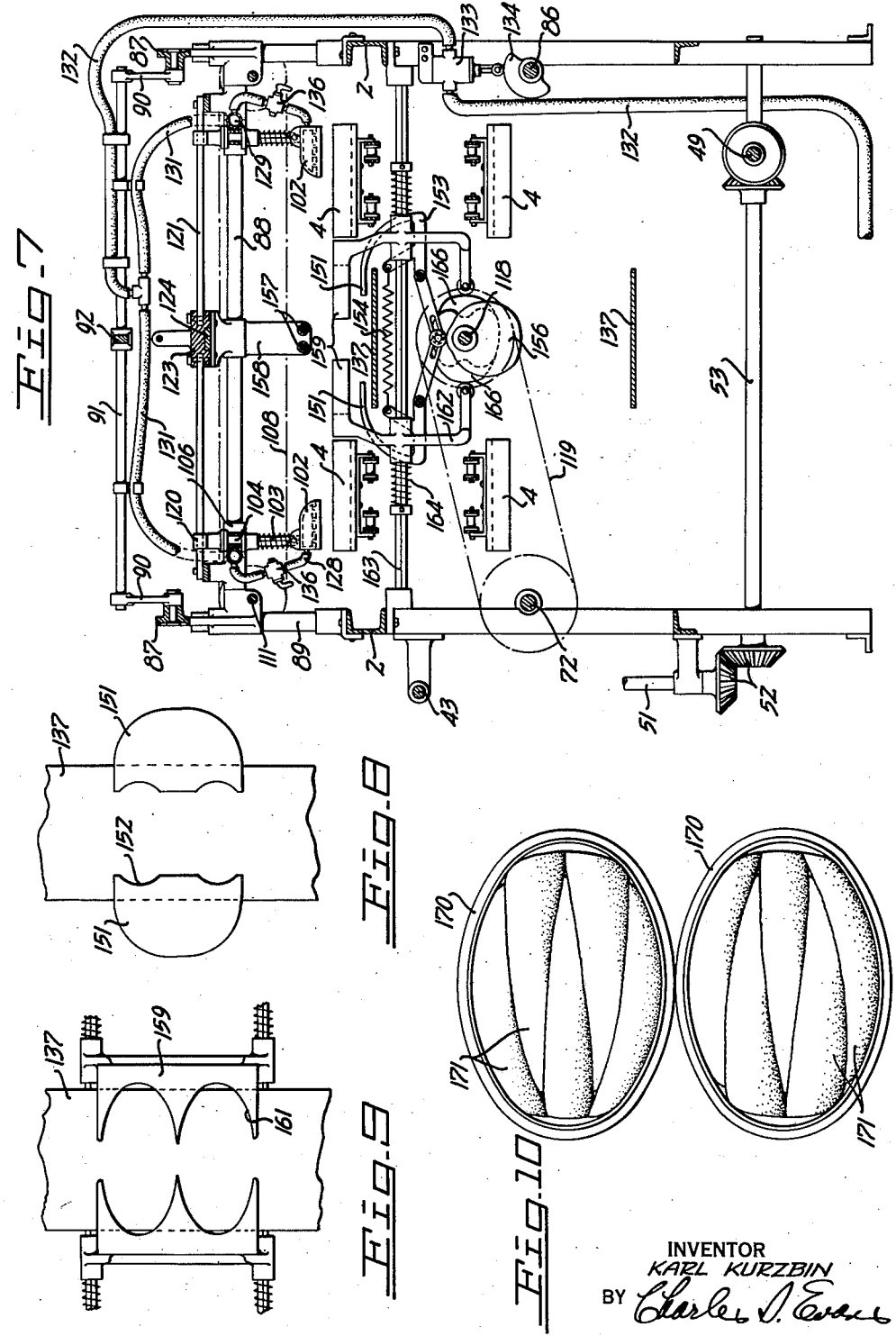

Aug. 10, 1943.   K. KURZBIN   2,326,146
CANNING APPARATUS
Filed May 2, 1939   6 Sheets-Sheet 6
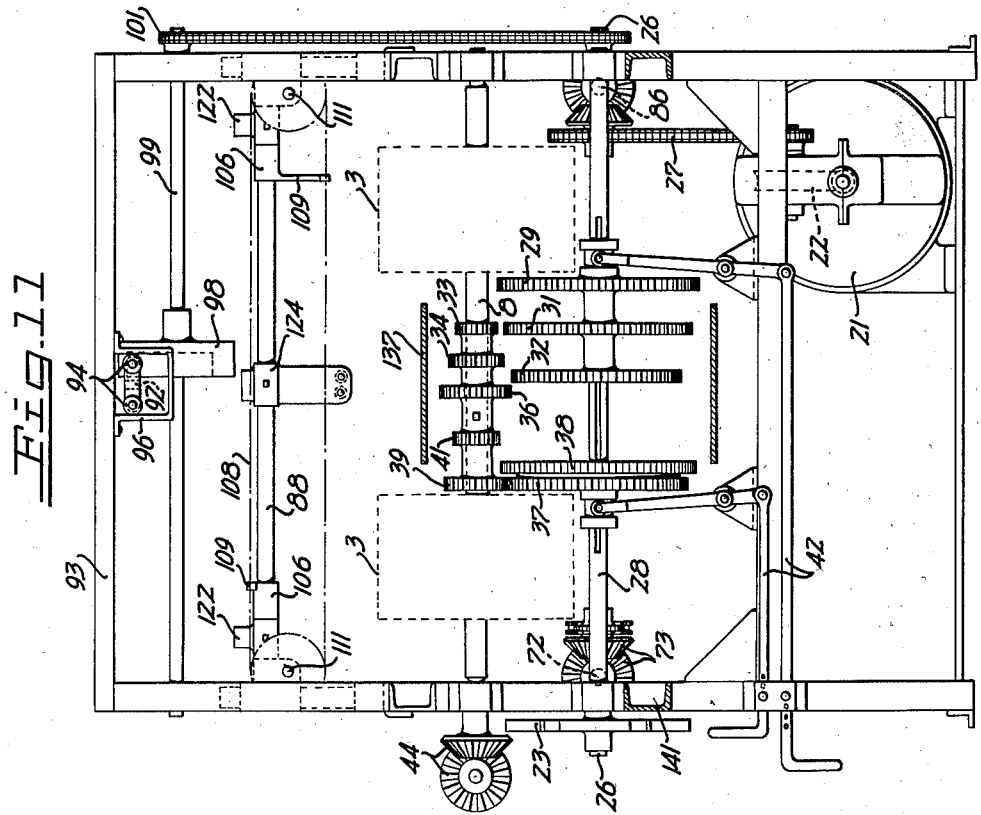
INVENTOR
KARL KURZBIN
BY Charles S. Evans
HIS ATTORNEY Patented Aug. 10, 1943

2,326,146

UNITED STATES PATENT OFFICE 2,326,146

CANNING APPARATUS

Karl Kurzbin, Monterey, Calif.

Application May 2, 1939, Serial No. 271,286

6 Claims. (Cl. 226—14)

My invention relates to apparatus for canning fish, such as sardines.

It is among the objects of my invention to provide means for automatically positioning fish in a pack with end portions intermeshed for placement in a can.

Other objects include the provision of means in the canning apparatus for severing the heads from the fish and automatically withdrawing the entrails therefrom.

A further object is to provide improved fish carrying elements embodying vacuum cups for engaging the fish.

Another object is to provide means for controlling the number of fish placed in a can.

A still further object is to provide vacuum means for withdrawing the entrails from the fish.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is a side elevational view of the left hand portion of a fish canning apparatus embodying the improvements of my invention; and Figure 2 is a fragmentary sectional view showing the control for the vacuum valve at the entrail removing station.

Figure 3 is a side elevational view associated with Figure 1, showing the right hand portion of the apparatus.

Figure 4 is a detail vertical sectional view taken in a plane indicated by line 4—4 of Figure 3, illustrating operating mechanism for the fish carrying elements.

Figures 5 and 6 are plan views of the left and right hand portions of the apparatus; Figure 6 being partially in section as indicated by line 6—6 of Figure 3.

Figure 7 is a vertical sectional view of the machine taken in the plane indicated by line 7—7 of Figure 3.

Figure 8 is a fragmentary plan view showing the can holders; and

Figure 9 is a similar view of the fish conforming elements.

Figure 10 is a plan view of two cans showing the packed fish.

Figure 11 is a vertical sectional view of the machine, taken in the plane indicated by line 11—11 of Figure 3.

Figures 12 to 14 are diagrammatic plan views showing various steps in the canning operation; and Figure 15 is a side elevational view of the fish in a pack after the tail portions have been lowered into a can.

In terms of broad inclusion, my canning apparatus comprises conveyor means for feeding fish sideways along a pair of spaced paths; means disposed along the paths for severing the heads from the fish; means along the paths for removing the entrails from the fish; means for moving the fish endwise toward a point intermediate the paths to position the fish in a pack with end portions intermeshed; and means for placing the pack in a can. The fish are fed with an intermittent motion, and the entrails are removed by vacuum during a rest period. Endwise movement of the fish into the pack is preferably effected by carrying elements having vacuum cups for engaging the fish during a rest period of the feeding means; and selective means are provided for controlling the number of fish positioned in the pack.

In greater detail, and referring to the drawings, the apparatus embodying my invention as adapted for canning sardines comprises an elongated frame 2 for supporting the mechanism of the various conveyors and operating stations in the machine.

*Conveyor system.*—A pair of fish conveyors 3 are provided to extend longitudinally along each side of the machine. These conveyors are formed by recessed blocks 4 mounted on chains running on suitable sprockets on shafts 7 and 8 at the ends of the machine. Recessed blocks 4 carry the bodies of the fish and have integral end portions 9 for receiving the tails; the recesses being preferably tapered to conform with the contour of the fish.

Short conveyors 12 are also provided along the outer sides of conveyors 3 at the head end of the machine (Figures 1 and 5), and have recessed blocks 13 mounted on chains 14 running on sprockets 16 and 17. Blocks 13 of the short conveyors are aligned with body blocks 4 and receive the heads of the fish, and are spaced slightly from the body blocks. Rear sprockets 16 are also mounted on tail shaft 7 so that the conveyors move at the same speed, and leading sprockets 17 of the short conveyors are mounted on a cross shaft 18 journaled on the intermediate portions of the frame. Figure 1 shows how the blocks of the conveyors are mounted on the chains.

Fish are carried onto the machine by a conveyor belt 19 having its forward end lying between conveyors 3, and operators working at each side take the fish from the supply belt and place them in the blocks or conveyors 3 and 12 with the heads lying in blocks 13 and the tails on the inside opposing the tails on the other conveyor.

The conveyors are driven with an intermittent motion by a suitable motor 21 through a reduction gear 22 and a Geneva star 23. See Figure 3. Pin 24 of the star is mounted on a cross shaft 26 rotated at a uniform speed of say 30 R. P. M. by a chain 27 from the reduction gear. Star 23 is mounted on a cross shaft 28, and the six-point star employed causes shaft 28 to make five R. P. M. with thirty stops per minute. Shaft 28 is connected to conveyor shaft 8 through a gear change system comprising a set of shiftable gears 29, 31 and 32 on shaft 28 engageable with gears 33, 34 and 36 on shaft 8, and a second set of shiftable gears 37 and 38 engageable with gears 39 and 41. This gives a selection of five different intermittent speeds for the conveyors; and adapts the machine for placing different numbers of fish in a can, say from four to eight fish to a can. Suitable levers 42 are preferably provided for changing gears.

Short conveyors 12 are connected to move in time with conveyors 3 by a shaft 43 alongside the frame and connected at one end to shaft 8 by gears 44 and at the other end to shaft 18 by gears 46.

*Cutting station.*—Two pairs of circular knives 47 are mounted on an overhead shaft 48, and the outer knives are arranged to project into the spaces between conveyor blocks 4 and 13 to sever the heads from the fish. The inner knives project into grooves 49 provided between block portions 9 and the body portions 4 to sever the tails from the fish. The fish heads are subsequently dumped off the ends of short conveyors 12 into suitable receivers, and the tails are carried on through and dropped off the ends of conveyors 3. Knives 47 are rotated continuously at high speed by a shaft 49 coupled directly with the motor, and a vertical shaft 51 connected at one end to shaft 49 by gears 52 through a short cross shaft 53 and at the other end to shaft 48 by gears 54.

*Entrail removing station.*—After the heads are dropped, the bodies of the fish continue on conveyors 3 to a pair of suction heads 56 disposed at each side of the machine flush with the outer edges of the conveyors. Each suction head has eight passages 57 ported out on the side surface of the head, and the passages are aligned with the recesses in the conveyor blocks when the conveyor comes to rest so that the suction ports register with the ends of the fish from which the heads have been severed. The outer ends of passages 57 open into a receiver or casing 58 which discharges through chute 59 into a sealed container (not shown) for retaining the entrails.

Vacuum is developed in receiver 58 by an overhead duct 61 leading to a suitable vacuum pump. The lowered pressure thus created in passages 57 causes the entrails to be withdrawn from the fish and discharged through chute 59. Suction is controlled by a valve cylinder 62 carrying sections of the passages and turnable to open or close the latter. The valve is operated in time with the conveyor so that the passages are open during the rest period and are closed when the conveyor is moving. Hand cocks 63 are also provided for two of the passages at each side of the suction head, to close off one or more of these passages as desired, depending upon the number of fish being placed in a can. The four central passages are not cocked because four fish to the can is the minimum pack.

Valve cylinder 62 is actuated by a segment rack 64 meshed with a gear 66 on the projecting end of the cylinder, as shown in Figure 2. Rack 64 is carried on a pivoted arm 67 connected through link 68 with a follower 69 rising on a cam 71 carried by shaft 72. The latter shaft extends forward and is driven from shaft 26 through gears 73; this ratio being 1 to 1 so that shaft 72 also turns 30 R. P. M. Cam 71 turns valve cylinder 62 back and forth once during each revolution of shaft 72, and therefore times the opening and closing of the valve with the periodic movement of the conveyor.

Means are also provided for holding the fish during removal of the entrails. This is done by a pair of reciprocating heads 74 overlying the conveyors and pivotally mounted for vertical movement on parallel bars 76 pivoted to the frame. The lower bar is connected by a link 77 to a follower 78 riding on a cam 79 on shaft 72, so that head 74 comes down when the conveyor stops. Each head has a series of eight depending feet 81 carried on slide rods 82 and pressed downwardly by springs 83. These hold down feet are limited in their depressed positions by collars 84 at the top of rods 82, thus allowing the feet to clear the fish when head 74 is elevated. The depending feet are aligned with the conveyor blocks when the conveyors come to rest; and the lower faces of the feet are preferably concave to register with the backs of the fish. A cross brace 85 is also preferably provided between upper bars 76 for stability, since both heads move in unison. As shown in Figure 11, cam shaft 72 lies along one side of the machine, and a similar shaft 86 lies along the other side for operating the cams on the back side.

*Canning station.*—After removal of the entrails the fish continue their sidewise movement along the spaced parallel paths defined by conveyors 3 until they underlie a reciprocating carriage head extending transversely across the machine. As shown in Figures 3, 6 and 7, the head is made up of a pair of arched side beams 87 connected by end rods 88; the rectangular head structure being vertically slidable on corner posts 89. The head is suspended by links 90 from a cross bar 91 supported by a center lever 92. See Figure 7. Lever 92 is pivoted at one end to superstructure 93 on the frame and is guided at the other end by rollers 94 in a guideway formed by strap 96, as shown in Figures 3 and 11.

A follower 97 on lever 92 rides on a cam 98 carried by a cross shaft 99, and the latter is driven by a chain 101 from shaft 26. This drive is 2 to 1 so that cam shaft 99 turns 60 R. P. M., thus causing the carriage head to make two complete reciprocations for each period of conveyor movement. The timing is such that the head moves down and up as soon as the conveyors come to rest, and after an interval moves down and up again before the conveyors come to another rest period.

Means are provided on the head for lifting fish from the conveyors and moving them endwise toward a point intermediate the conveyors to position the fish in a pack with the tail portions intermeshed. This is accomplished by two sets of carrying elements depending from opposite sides of the carriage head; each set having eight carrying elements in the machine illustrated. The elements preferably comprise vacuum cups 102 pivoted on the lower ends of rods 103 which are mounted in blocks 104 slidable along bars 106. These rods are held against turning so that vacuum cups 102 remain parallel at all times. Springs 107 normally hold cups 102 horizontal, yet permit the cups to be tilted about their pivot axes. In their outer positions, as shown in Figure 7, the carrying elements overlie the conveyors, and are spaced to register with the fish when the carriage head is lowered at this point.

The two sets of fish carrying elements are movable toward the center of the machine by bars 106 being slidably mounted on end rods 88 of the carriage head. See Figure 6. Movement of slide bars 106 in and out is effected by chains 108 extending transversely across the ends of the head and having lugs 109 on the upper and lower reaches connected to ends of the slide bars; one bar being fastened to the lower reach and the other to the upper reach. Driving the chains in one direction thus causes simultaneous inward travel of the bars, and reverse movement of the chains effects simultaneous outward travel of the bars.

Sprocket shafts 111 of chains 108 are driven by gears 112, one of which is slidably splined to a vertical shaft 113. These shafts are in turn rotated by racks 114 actuated by followers 116 on a central cam 117 on shaft 118, as shown in Figure 4. The latter shaft is driven by a chain 119 (Figure 3) from shaft 72, and also rotates at 30 R. P. M. so that carrying elements 102 move in and out once during each period of conveyor movement; the timing being such that the elements move in after the first vertical reciprocation of the carriage head and then out after the second reciprocation of the head.

Means are provided for guiding the fish carrying elements along converging paths as they move toward center. This is done by swivel heads 120 on rods 103 slidably engaging guide rails 121 which are pivoted for adjustment at their outer ends to head bars 122 and at their inner ends to slide blocks 123 on a central head bar 124. These blocks are adjustable relative to the amount of their separation by a screw 126 having a hand wheel 127. Four of the guide rails 121 in each set are connected to opposite sides of the two center blocks 123 so that half of the rails may be adjusted relative to the other half.

As shown in Figure 6, the guide rails on one side of the center blocks are offset relative to those on the other side to cause the tail portions of the fish on one side to intermesh with the tail portions on the other side as the fish are brought together by the carrying elements. Eight of the guide rails (four on each side) serve to position fish in one pack, and the other eight operate to assemble fish in another pack; the separation of the two packs of course being regulated by the spacing of blocks 123. The ends of the guide rails on each block are so spaced to bring the fish closely together in the individual packs.

Suction is created in cups 102 of the carrying devices by flexible vacuum ducts 128 leading from manifolds 129 on slide bars 106. Branch ducts 131 from a main duct 132 provide flexible connections with the manifolds, and a valve 133 in the main duct functions to control the suction from the vacuum pump. The latter valve is operated by a cam 134 on shaft 86, and since this is a 30 R. P. M. shaft the valve opens and closes in time with the conveyor movement. The timing is such that the valve opens when the vacuum cups are lowered by the head against the fish on the conveyors and closes when the carrying elements are again lowered at the center of the machine.

Vacuum cups 102 of the carrying elements may be of any suitable construction, and are preferably provided with suction ports opening out from a body chamber onto the concave lower surface of the cup. If desired the cups may be moulded of rubber with thin edge flaps for sealing against the fish to insure positive holding. Suitable hand operated cocks 136 are also provided in ducts 128 to shut off the vacuum from selected cups.

Means are provided for delivering cans to fish receiving positions underlying the two packs. A central can conveyor belt 137 is provided for this purpose, running on wheels 138 and 139 located at the intermediate and end portions of the machine. End wheel 139 is carried by an extension 141 of the frame to bring the loaded cans out. The can conveyor is moved intermittently in out-of-phase timing with the fish conveyors 3; that is, the can conveyor moves when the fish conveyors come to rest. A second Geneva star 142 is mounted on a jack shaft 143 geared to wheel shaft 144, and drive pin 146 of the star is mounted on a short shaft 147 driven from shaft 26 by a chain 148, all as shown in Figures 3 and 6.

Empty cans are delivered to belt 137 by an inclined chute 149 so that a string of cans are fed to the filling position. In the latter position two adjacent cans are engaged by holders 151 (Figure 8) having concave recesses 152 for gripping and centering the ends of the oval cans. Slight misalignments between cans are thus corrected, and the cans are firmly held for filling. After receiving the two packs of fish, conveyor belt 137 moves ahead a distance corresponding to two can widths to bring two more empty cans between holders 151. The can holders are pivoted on arms 153 urged together by a spring 154 and controlled in their movement by a cam 156 on shaft 118.

Placement of the fish in the cans is facilitated by tilting the intermeshed fish to lower the tail portions so that these narrower portions enter the can first. Tilting is effected by rollers 157 hung from the center of the carriage head by a bracket 158, and so positioned in the path of the inwardly moving carrying elements that the inclined faces of vacuum cups 102 engage the rollers to depress the adjacent cup ends. In this tilted position the packs are then lowered into the cans by downward movement of the carriage head. As soon as the fish enter the cans valve 133 closes to cut off the vacuum and release the fish.

Means are also provided for conforming the larger head portions of the fish to the cans. As shown in Figures 7 and 9, a pair of forming elements 159 having recesses 161 shaped to the contour of the cans, are mounted immediately above the cans at the ends of the latter. These forming elements are carried on arms 162 slidable on bars 163 and urged together by springs 164. Movement of the elements is controlled by cams 166 on shaft 118. The fish are readily deformable, and, once being shaped to the can, the entire pack of fish drops nicely into the can when the forming elements are retracted.

*Operation.*—Incoming fish are picked up from delivery belt 19 and placed, heads out, in the recesses of conveyor blocks 4 and 13 by operators standing alongside the machine. The fish are then carried sideways through the machine with an intermittent motion by the conveyors, and as they pass through the cutting station the heads and tails are severed from the bodies by knives 47. Subsequently the heads are dumped over the ends of conveyors 12 and the bodies are carried forward to the entrail removing station.

When the conveyors come to rest at suction heads 56 the hold down feet 81 are depressed to engage the fish, and vacuum valve 62 opens to withdraw the entrails. Feet 81 are then retracted and valve 62 is closed, whereupon the conveyors move ahead another step.

When the conveyors come to rest at the canning station carriage head 87—88 moves down to lower cups 102 into engagement with the fish, and vacuum valve 133 opens. Subsequent elevation of the carriage head lifts the fish from the conveyors, and when the carrying elements travel inwardly the fish are moved endwise into intermeshed position, forming two separate packs. As the fish are meshed they are also tilted, tail ends down, by the vacuum cups engaging with rollers 157. Thereupon the carriage head moves down again to deposit the fish in cans engaged by holders 151, and vacuum valve 133 closes to release the fish.

After the vacuum cups have moved up out of the way, forming elements 159 move in to shape the packs to the cans, and, when these elements retract, the fish drop fully into the cans. Holders 151 then retract, and the can conveyor 137 moves up two empty cans to replace those filled.

My machine, as described, will pack from four to eight fish to the can. The only adjustments necessary are to shift conveyor gears 29—41, adjust the spacing of guide rail blocks 123, and open the proper number of cocks 63 and 136 at the entrail removing station and on the fish carrying elements. The conveyor gears are of such ratio that the conveyors may be advanced a predetermined distance during the period of motion, depending upon the number of fish to be packed.

Thus, if four fish are to be packed per can, the conveyor speeds are set to advance four fish under the four central vacuum cups 102 at each side of the machine. Cocks 136 of the other vacuum cups are then closed so that only those above mentioned are active. Two fish are therefore carried endwise toward each end of the individual cans, making a pack of four. With such a pack all of cocks 36 at entrail removing station are closed, leaving only the four central passages open. When the four leading fish are advanced by a conveyor into position to be picked up by vacuum cups 102, four newly cut fish are moved into registration with the four central passages of each entrail suction head. Thus, all of the fish on the conveyors are cleaned out prior to reaching the canning station. Guide rail blocks 123 are set to bring the central axis of each pack of four fish into registration with the axis of an underlying can, thus completing the adjustments.

In packs having odd numbers of fish the action is slightly different and this will be described in connection with Figures 10 and 12 to 15, illustrating five fish to a can. Figure 10 shows two freshly packed cans 170 with the fish 171 lying two at one end and three at the other; it being noted that the two's and three's are oppositely disposed in different cans, so that a total of five fish are moved toward the cans from each side of the machine.

Figures 12 to 14 show the groups of five fish in subsequent steps of the operation. It is seen that when the groups of fish are brought endwise together (Figure 14), there are three on one side for the leading pack and two on the other, with just the reverse arrangement for the trailing pack. Cocks 136 of the vacuum cups are set to pick up the fish in this relationship.

The conveyor speeds are set to bring up five fish at a time, and when the machine is started the leading fish are not aligned but the right hand conveyor has one fish in advance of the other conveyor to position the two groups of fish as shown in Figure 14 when they are ready to be picked up by the vacuum cups. The cocks 63 of the entrail suction heads are also set to register with the fish in the same relationship, as shown in Figure 13.

I claim:

1. Apparatus for canning fish comprising means for positioning fish in a pack with end portions intermeshed over a can, means for lowering the intermeshed portions of the fish into the can, and means for conforming other portions of the fish to the can.

2. Apparatus for canning fish comprising means for positioning fish horizontally in a pack with tail portions intermeshed over a can, means for tilting the fish to lower the tail portions into the can, and means for conforming the head portions of the fish to the can.

3. Canning apparatus comprising a pair of conveyors for feeding articles toward a canning station, a plurality of carrying elements at the station for receiving articles from the conveyors, means for elevating the carrying elements and moving the same toward a packing position intermediate the conveyors, means for guiding said elements to deliver the articles into a pack, and means for lowering the elements to place the pack in a can.

4. Apparatus for canning fish comprising a pair of conveyors for feeding fish toward a canning station, means for positioning the fish on the conveyors with the tail portions of fish on one conveyor opposed to tail portions of fish on the other conveyor, a plurality of fish carrying elements at the station for receiving fish from the conveyors, means for moving the elements toward a packing position intermediate the conveyors, and means for guiding said elements to deliver the fish endwise into a pack with the tail portions of fish delivered from one conveyor intermeshed with the tail portions of fish delivered from the other conveyor.

5. Canning apparatus comprising a pair of conveyors for feeding articles toward a canning station, a reciprocative head at said station, a group of carrying elements on the head for receiving articles from one of the conveyors, a second group of carrying elements on the head for receiving articles from the other conveyor, means for reciprocating the head to simultaneously move the carrying elements, and means for moving said elements relative to the head.

6. Canning apparatus comprising a pair of conveyors for feeding articles toward a canning station, a plurality of guides mounted at the canning station and converging toward a common packing point between the conveyors, the guides converging from one conveyor being staggered with respect to those converging from the other, carrying elements for receiving articles from the conveyor, said elements being mounted for movement along the guides between receiving positions over the conveyor and delivering positions over the packing point, and means for actuating the carrying elements along the guides.

KARL KURZBIN.